Figure 1:
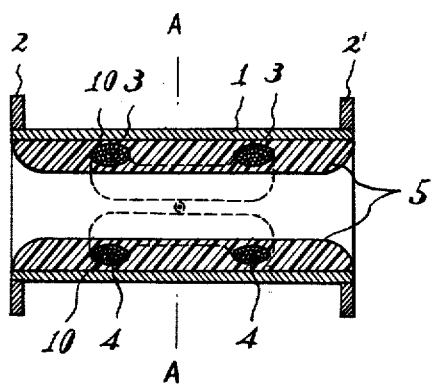

United States Patent Office 3,108,474
Patented Oct. 29, 1963

3,108,474
TRANSMITTER OF ELECTROMAGNETIC
FLOWMETER
Jun-Ichi Sasaki, 57 4-chome, Denenchofu, Otaku, Tokyo, and Masaru Watanabe, 790 Karasuyamacho, Setagaya-ku, Tokyo, Japan
Filed Mar. 14, 1960, Ser. No. 14,979
Claims priority, application Japan Mar. 12, 1959
2 Claims. (Cl. 73—194)

This invention relates to a transmitter of the electromagnetic flowmeter. Heretofore such a transmitter was built by means of providing bundles of wires carrying exciting current outside of a stainless-steel pipe having an insulating sheet therebetween, and upon said bundles of wires was mounted a magnetic core, over which a water proof housing was put on. Such a construction as described above is inevitably subjected to the danger of deviation in the direction of magnetic flux which shift the zero point of the meter-indication because of a relative displacement of the core with respect to the pipe as may take place when installed at the site, and because of a deformation of the wire bundle due to the temperature rise caused by the electrical current flowing therethrough during the time when the transmitter is in operation. Further, due to the fact that the fluid pipe is situated in a strong magnetic field as may be necessary for such construction, eddy currents are induced in the material of the pipe. Thus the magnetic field not only causes a substantial loss of energy but it also induces an injurious magnetic flux which bring about an error in the measurement. The effect due to the eddy current increases with the thickness of the pipe; the higher-pressured fluid necessitating a greater thickness of the pipe wall.

The principal object of this invention is to provide a transmitter of the electromagnetic flowmeter in which the direction of magnetic flux does not deviate.

Another object of this invention is to provide a transmitter in which the eddy current that may be induced in the material of pipe is very low.

The above stated objects of this invention are accomplished according to the feature of the invention characterized by the wire-bundles for the exciting current being disposed on the interior wall of the pipe and a mantle of insulating material being molded thereon.

The transmitter built according to the above said feature of this invention has an important advantage in that the wire-bundles for the exciting current are very stably fixed, and they do not deform due to the temperature rise thereof caused by the electrical current flowing therethrough (this temperature rise has been usually estimated to be about 40° to 60° C.) because of the wire-bundles being embedded in the insulating layer molded on the interior wall of the pipe.

An embodiment example of this invention is shown in the drawings, according to which this invention will be explained in further detail.

Figure 2:
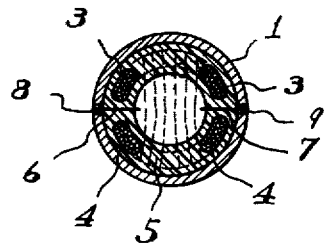

FIG. 1 schematically shows the transmitter in longitudinal section, and FIG. 2 is a cross-sectional view along the line A—A in FIG. 1.

In the drawing, a metallic pipe 1 made advantageously of a magnetic material has at both ends flanges 2 and 2' which are to be connected with the corresponding flanges of the pipeline into which this transmitter is to be inserted. The wire-bundles 3 and 4 which are excited by an alternating current are embedded in a molded cylindrical insulating layer contiguous to the inner wall of the said magnetic pipe 1.

Further, in the said molded cylindrical insulating layer there is installed therethrough a pair of detector electrodes 6 and 7 in order to pick up the voltage which is induced by virtue of the flow rate of the liquid. The said pair of detector electrodes 6 and 7 are mounted oppositely to each other in the direction at right angles to the magnetic field produced by the alternating current in the wire-bundles 3 and 4, and the tips of the electrodes are slightly protruding into the flowing liquid from the inner surface of the molded layer 5. The opposite ends of both electrodes 6 and 7 are led out of the pipe 1 through the insulating bushing 8 and 9, respectively, the said bushings 8 and 9 serving to insulate the electrodes 6 and 7, respectively, from the pipe 1. Around the wire-bundles 3 and 4 is bound a shield tape 10, which may alternatively be inserted into the molded layer in an arrangement of stripes only.

As for the material of the molding 5, any material having a sufficient electrical insulating property and the possibility of easy molding may be adopted, those having smaller expansion and characteristics due to temperature variation are better. Concrete or similar material may be utilized as they are readily available. Molding materials may advantageously be mixed with powder of inorganic compounds such as alumina, quartz or the like, which are deemed to be effective to raise thermal conductivity to promote the cooling effect of the wire-bundles as molded thereby. If the flowing fluid to be measured is of corrosive property, noncorrosive molding material should be chosen as a matter of course.

In case this invention is used in a flowmeter which is to be installed for a pipe of a large diameter, it is desirable that, instead of concentrating the wire-bundles 3 and 4 as shown in the drawings, wire-bundles in a shape of a thin layer also can be used; the wire-bundles being distributed over a wide range of the interior wall of the pipe 1. In such a manner as above, the thickness of the molding 5 may be substantially as thin as that of the usual lining of the pipe, and, therefore, not only the effective cross sectional area of the pipe may be relieved from being decreased, but also the manufacturing cost is considerably lower.

It will be understood that the above stated embodiment example is nothing but an illustrative example of this invention so that it does not limit the scope of this invention.

Having thus described the invention, what is claimed as new and desired to be secured by Letters Patent is:

1. A transmitter of electromagnetic flowmeter comprising a pipe member to be inserted into the pipe line through which the fluid flows, separate bundles of wires adapted to carry magnetic excitation current, a molded layer of electrical insulating material disposed on the interior wall of said pipe member, a pair of spaced apart detector electrodes carried by said pipe member and arranged to contact said fluid, said bundles of wire being embedded in said insulating material, and said bundles of wires and said electrodes being arranged to produce a uniform magnetic flux across the pipe member normal to an axis through said electrodes and said bundles of wires.

2. A transmitter of electromagnetic flowmeter comprising a pipe member to be inserted into the pipe line through which the fluid flows, separate bundles of wires adapted to carry magnetic excitation current, a pair of oppositely disposed detector electrodes carried by said pipe member, said separate bundles of wires for carrying excitation current being symmetrically disposed on the interior walls of the metallic pipe in a plane longitudinally dividing the metallic pipe to get similar halves thereof and including the common axis of the electrodes, the comon center line of both bundles of wires crossing the said common axis, a molded layer of electrical insulating material disposed on the interior wall of said pipe member, permitting said detector electrodes to contact said fluid and said bundles of wire being embedded in said insulating material.

References Cited in the file of this patent

UNITED STATES PATENTS

| | | |
|---|---|---|
| 2,691,303 | De Boisblanc | Oct. 12, 1954 |
| 2,734,380 | Mittelmann | Feb. 14, 1956 |
| 2,800,016 | Sturgeon | July 23, 1957 |

UNITED STATES PATENT OFFICE
CERTIFICATE OF CORRECTION

Patent No. 3,108,474　　　　　　　　　　October 29, 1963

Jun-Ichi Sasaki et al.

It is hereby certified that error appears in the above numbered patent requiring correction and that the said Letters Patent should read as corrected below.

Column 2, line 19, before "characteristics" insert -- contraction --; line 55, for "wire" read -- wires --.

Signed and sealed this 28th day of April 1964.

(SEAL)
Attest:

ERNEST W. SWIDER　　　　　　　　　　　　　　　EDWARD J. BRENNER

Attesting Officer　　　　　　　　　　　　　　　Commissioner of Patents